Nov. 6, 1934.  J. B. CHAPLINE  1,979,251
PROCESS AND APPARATUS FOR FORMING PAVING MATERIAL
Filed March 20, 1933  4 Sheets-Sheet 2
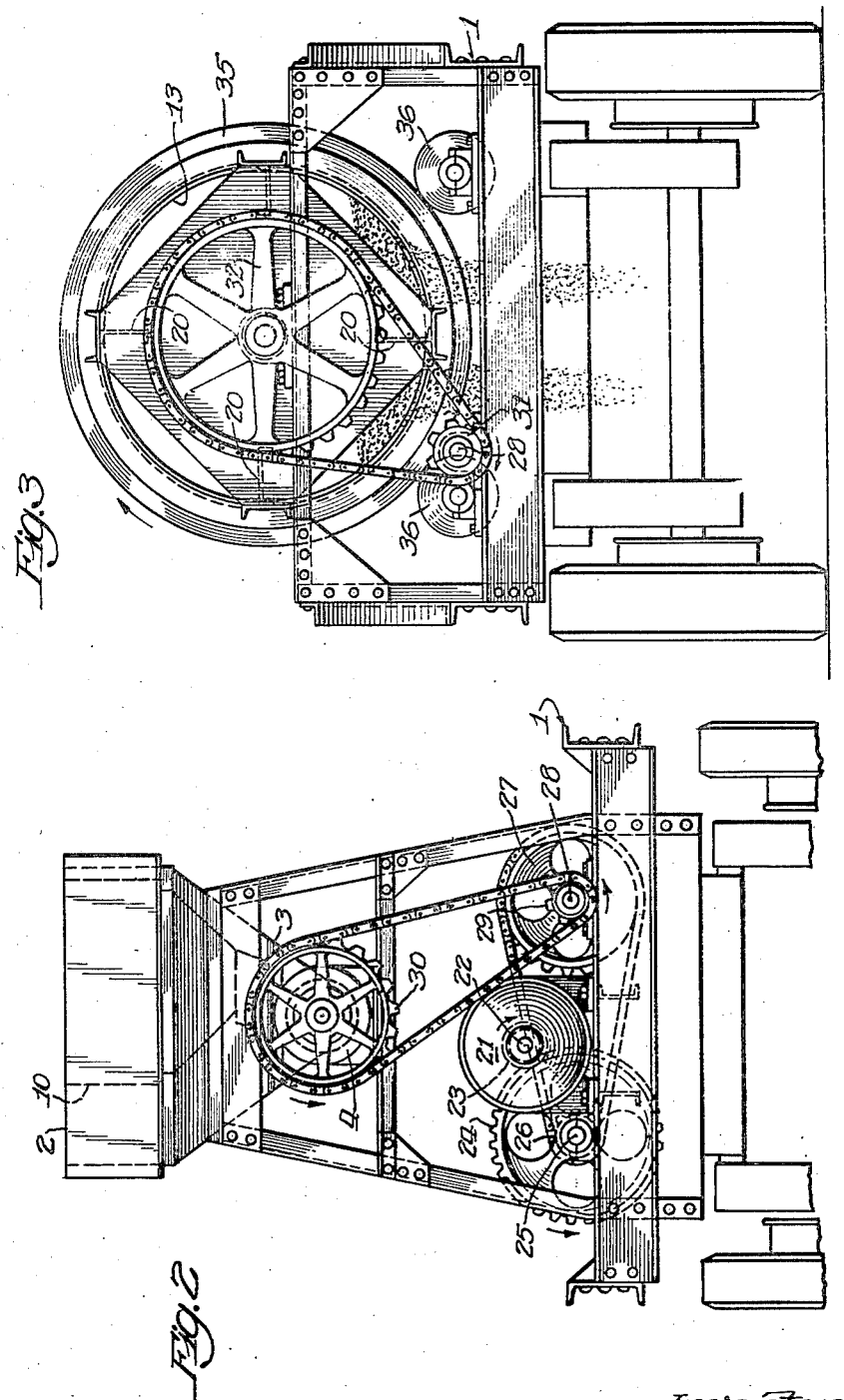
Inventor:
Jacob B. Chapline
By Parker & Carter Attys.

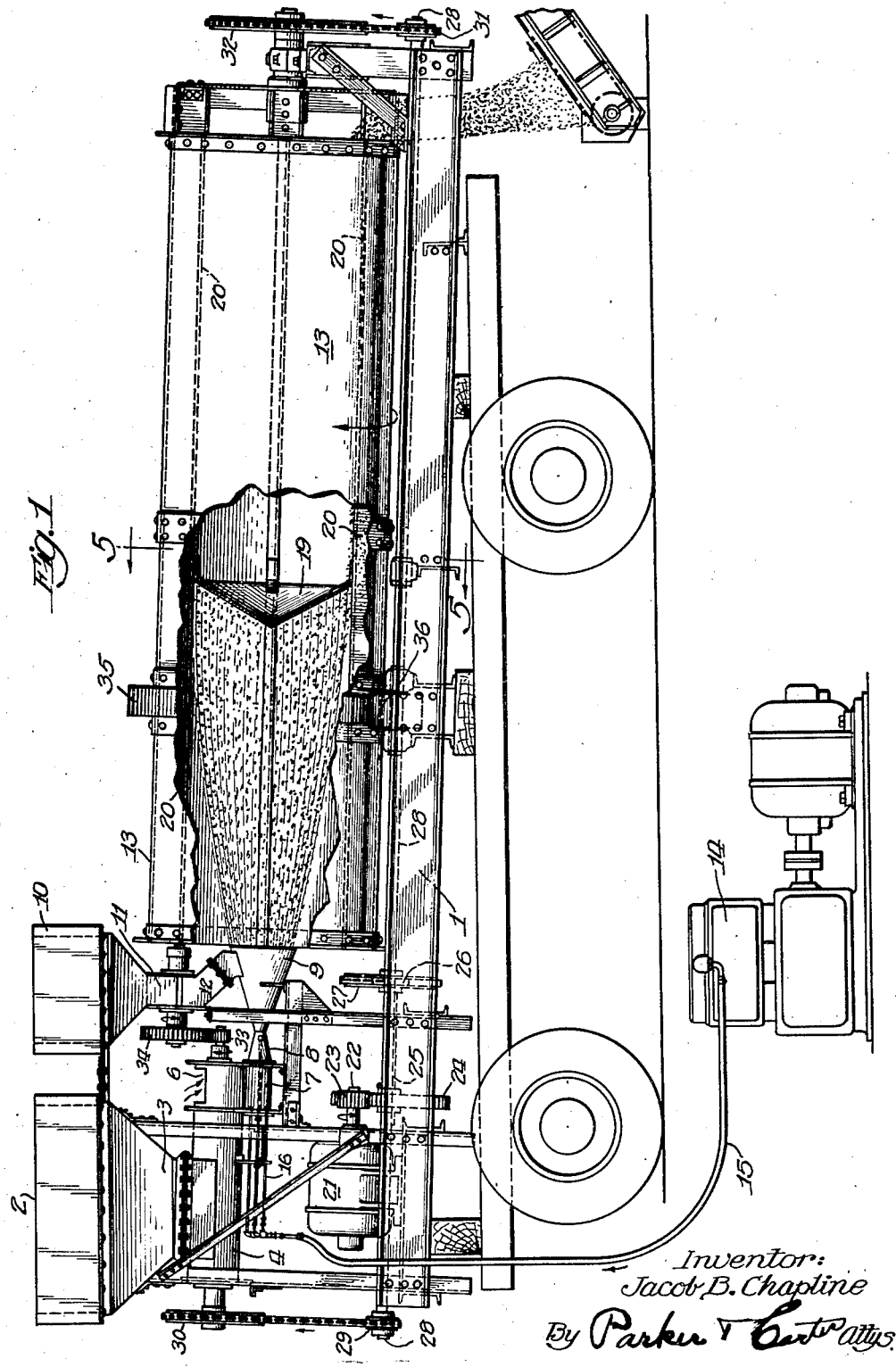

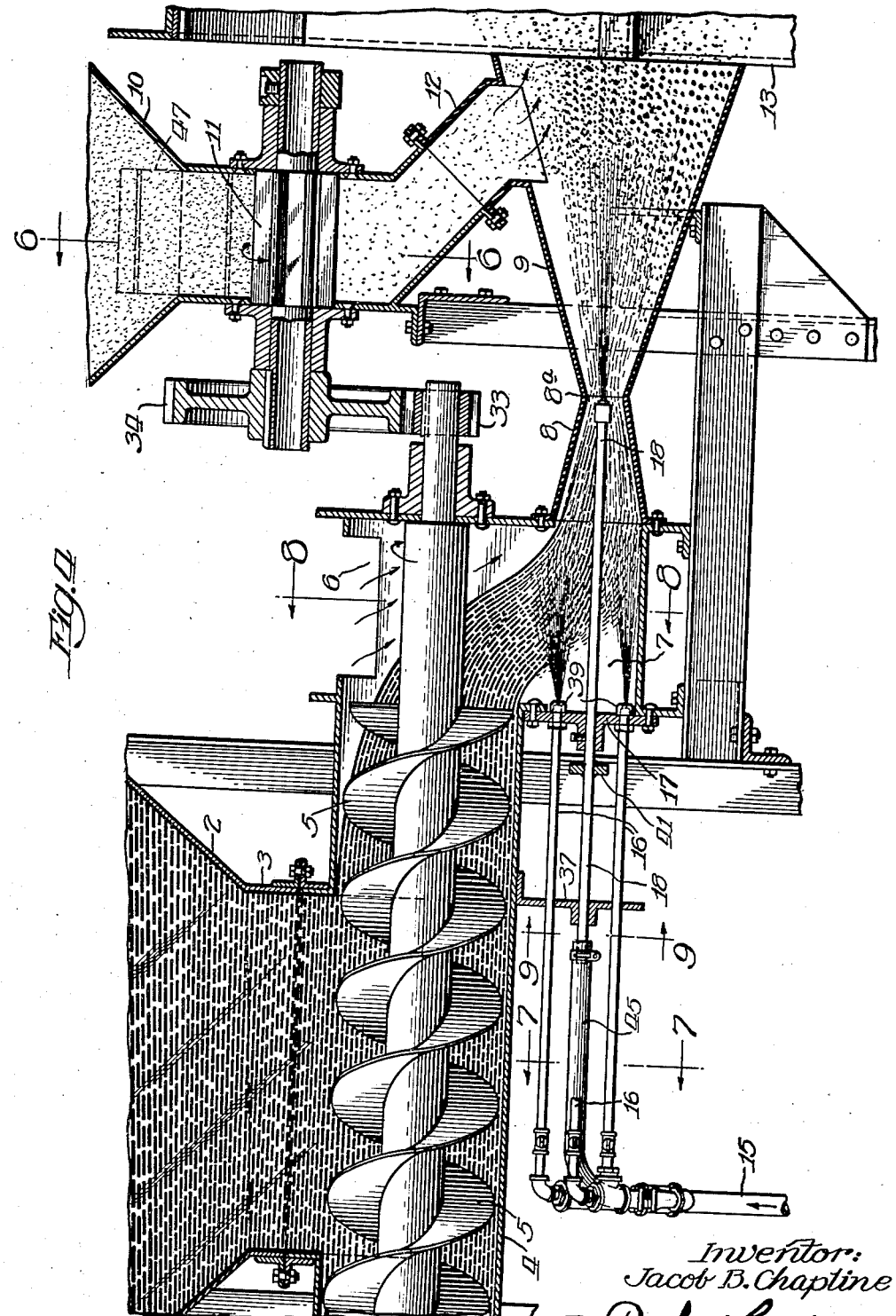

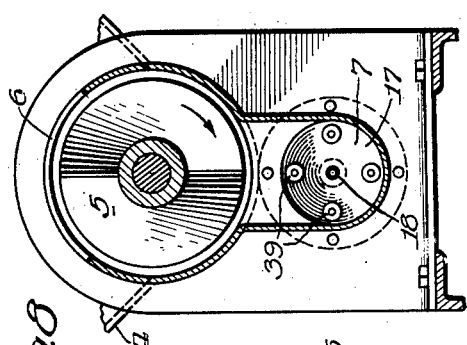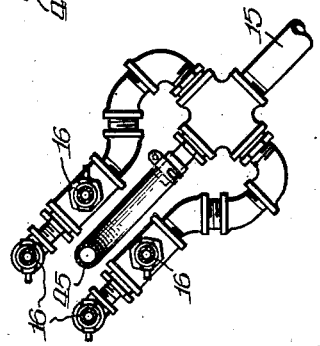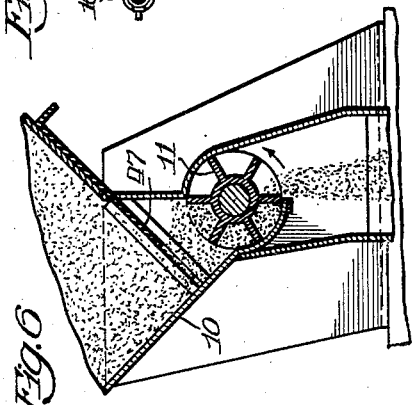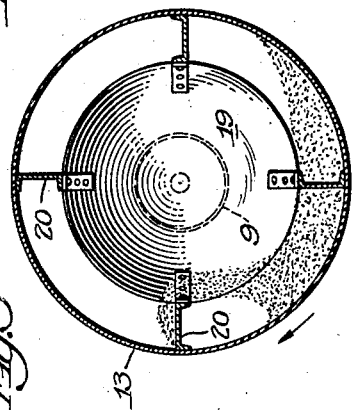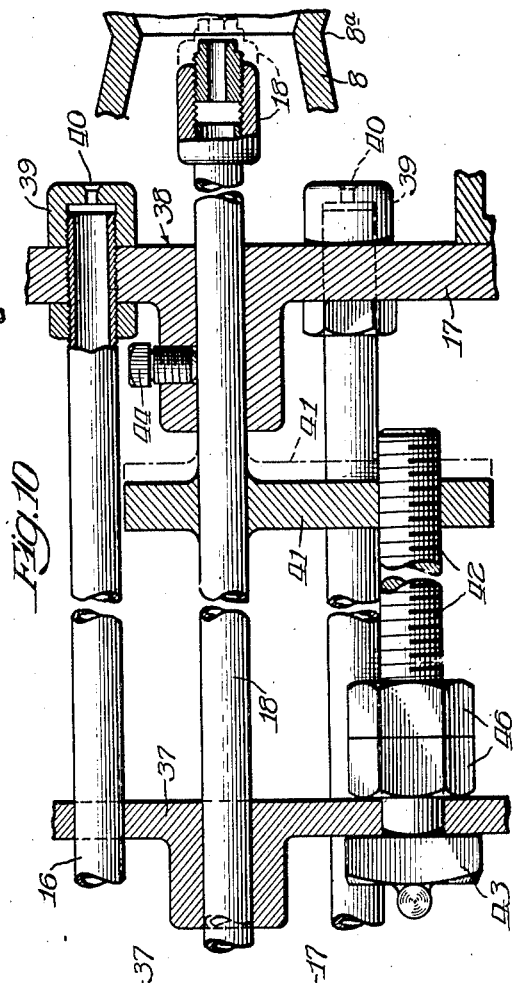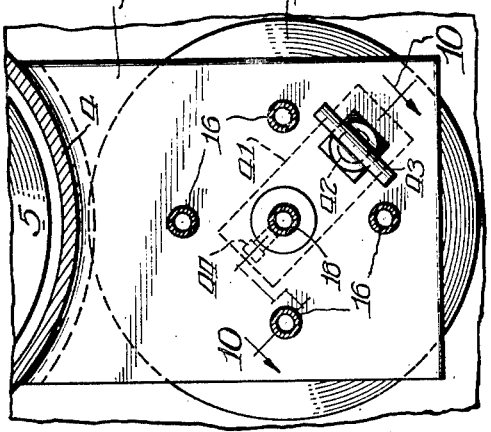

Patented Nov. 6, 1934

1,979,251

UNITED STATES PATENT OFFICE 1,979,251

PROCESS AND APPARATUS FOR FORMING PAVING MATERIAL

Jacob B. Chapline, Chicago, Ill., assignor of one-fourth to Grier D. Patterson, Evanston, Ill.

Application March 20, 1933, Serial No. 661,757

16 Claims. (Cl. 94—42)

This invention relates to process and apparatus for forming paving material and has for its object to provide a new and improved process and apparatus of this description. The invention has as a further object to provide a process and apparatus for disintegrating, cooling and dust treating bituminous material so as to form paving material. The invention has as a further object to break up the bituminous material into small particles by means of a blast of air, which also cools these particles; and it has as a further object to coat these particles, at the time they are being formed, with a coating of material which prevents them from cohering until used in the pavement. The invention has as a further object to create minute air cells in the particles as they are separated by the blast of air, the particles then being covered with dust and remaining separate when piled and until placed in position in the pavement. The invention has other objects which are more particularly pointed out in the accompanying description.

Referring now to the drawings, Fig. 1 is a side elevation in part section showing one form of apparatus involving the invention, with parts broken away;

Fig. 2 is a front view thereof;

Fig. 3 is a rear view thereof;

Fig. 4 is an enlarged sectional view through the mechanism for delivering material to the air blast;

Fig. 5 is a sectional view taken on line 5—5 of Fig. 1;

Fig. 6 is a sectional view taken on line 6—6 of Fig. 4;

Fig. 7 is a sectional view taken on line 7—7 of Fig. 4;

Fig. 8 is a sectional view taken on line 8—8 of Fig. 4;

Fig. 9 is a sectional view taken on line 9—9 of Fig. 4;

Fig. 10 is an enlarged sectional view showing the adjustment feature for the air nozzle.

Like numerals refer to like parts throughout the several figures.

Referring now to the drawings, I have illustrated a frame 1 upon which the apparatus is supported. Carried by this frame is a hopper 2 in which the heated bituminous material is placed. This hopper has a discharge end 3 which discharges the material into a trough 4 containing a conveyor 5, which is preferably a screw conveyor. This trough is provided with an opening 6 through which air may pass. The bitumen is discharged from the conveyor trough 4 into the air chamber 7 through which a blast of air, under pressure, is forced. Connected with the chamber is an air nozzle 8. This air nozzle is contracted at 8a and then enlarges again at 9. The blast of air separates the bituminous material into particles and also cools it. Additional air, which enters the conveyor trough 4 through the opening 6, is drawn into the air chamber 7 so as to assist in cooling the material. This additional air also acts as an auxiliary carrying medium for the particles of material.

The bituminous material, when it reaches the part 9 of the nozzle, has been forcibly divided into small particles. There is injected into the stream of small particles in the part 9 of the nozzle, stone dust, cement, fine sand, or other material which is in the hopper 10 and which passes through a distributor 11 which automatically feeds a predetermined quantity thereof into the pipe 12, and is thence drawn into the part 9 of the nozzle, mixing the fine particles and coating them. The bituminous material is thus completely disintegrated and the fine particles produced coated and cooled and provided with air cells and then injected into the revolving drum 13.

Any suitable means for injecting air into the air chamber may be provided. As herein shown, I have illustrated an air compressor 14 for compressing the air. This air compressor is connected by a pipe 15 with a series of nozzles 16, preferably four in number, which are spaced about the end 17 of the air chamber 7. These nozzles force air into and through this air chamber at a high speed, the air dividing the material into fine particles and producing air pockets therein, as above set out.

There is another air nozzle 18 which is connected to an air pipe extending through the air chamber 7 and which discharges a blast of air at the point 8a where the nozzle 8 is contracted. This gives an additional impetus to the particles, and these particles, by these air blasts, are discharged into the revolving drum 13. This revolving drum is provided with an impact baffle 19 which is preferably conical in shape. This baffle causes the material to fall to the bottom of the drum. The drum is provided with vanes 20 which pick up the material and roll it over and over, completing the dust coating of the various disintegrated particles with an even and thin film of cement, dust or other suitable material. This dust adheres to the damp and partially cooled particles. The drum is placed on a slant with the discharge end lower than the receiving end, and the tumbling action of the material through the remaining portion of the slanting and revolving drum completes the cooling and dusting of the material so that at its discharge end the material is cool enough to be carried by conveyors to stock piles, trucks or freight cars so that all danger of its packing is past.

The various parts may be driven by any suitable power, as by the motor 21. The driving shaft 22 of this motor is provided with the gear 23 which meshes with the gear 24 on a shaft 25. The shaft 25 is provided with a sprocket pinion 26 which, by means of a belt, drives the gear 27 on the main shaft 28 which extends substantially the entire length of the device. This main shaft has at one end a sprocket wheel 29 over which passes a belt which engages the sprocket wheel 30 which drives the conveyor 5. The conveyor shaft is provided with a pinion 33 which engages a gear 34 on the distributor 11 for the stone dust or the like, this distributor being thus driven from the conveyor shaft. The main shaft 28 at the other end is provided with a sprocket pinion 31 which, by means of a belt, drives the sprocket wheel 32 which is connected with the drum 13 so as to rotate it. The drum is provided with the supporting ring 35 which engages rollers 36. The motor may also be used to produce the compressed air for the air nozzle.

Various air nozzles may be used, but I have illustrated a form which I prefer to use. In this form, as illustrated in Figures 7, 8, 9, and 10, the four air nozzles 16 are spaced about the center nozzle and are preferably carried by the two blades 37 and 38. The nozzles are provided with the end pieces 39 which are screwed thereon and which have the discharge openings 40. The central nozzle 18 is preferably adjustable. It passes through openings in the members 37 and 38 and has attached to it a controlling member 41. Means is provided for moving this controlling member and thereby moving the nozzle 18. As herein shown, the member 41 has an opening in which fits the threaded member 42 which is loosely mounted in the member 37 and has the controlling handle 43. It will be seen that by rotating the threaded member 42 in one direction the nozzle 18 will be moved forward, and by rotating it in the other direction the nozzle will be moved in the opposite direction. The nozzle may be held in any desired position by the set screw 44. The central nozzle is connected with the main air pipe by a flexible member 45 so as to permit this adjustment. Lock nuts 46 are provided on the threaded member 42 to hold it against accidental rotation.

It will be noted that in this process the ordinary hot-mix paving mixture is preferably used and that the air blast, after separating the particles, moves them forward and that they are abruptly stopped by the baffle plate and the additional coating material placed on the particles. This material can be laid in the pavement cold and produce as an effective pavement thus laid as the ordinary pavement when laid hot. It is of course evident that this pavement can be laid hot if desired, but this is unnecessary. When laying the pavement cold complete adhesion of the particles is obtained by spreading, raking and compressing the material on the road foundation. The compressing is usually done with a roller and this tends to break down the air cells and thus effect a thorough amalgamation of the particles into a solid paving mass. No solvent or chemical is used, hence the original characteristics of the ingredients remain unchanged. Since the machine carrying the apparatus is portable it can be economically used as a temporary or permanent adjunct to any standard asphalt mixing plant without alteration or rearrangement of any part of the mixing plant.

The hot-mix usually used in carrying out my process consists of asphalt mixed with sand or crushed stone or gravel or the like, all formed into a heated mass, and this heated mass is then acted upon by the air jets and the sizes of the disintegrated particles will depend upon the size of the sand particles or rock particles or pebbles or the like used with the asphalt.

I claim:

1. The process of forming paving material which consists in utilizing hot paving material, disintegrating it by an air blast into fine particles, and coating these fine particles with a dust which becomes a part of the pavement when laid, and cooling the particles whereby said particles will remain separate when piled.

2. The process of forming paving material which consists in utilizing hot paving material, disintegrating it by an air blast into fine particles and forming minute air cells in said particles, and coating these fine particles with a dust which becomes a part of the pavement when laid, and cooling the particles whereby said particles will remain separate when piled.

3. The process of forming paving material, which consists in utilizing hot paving material, disintegrating it by an air blast into fine particles, and coating these fine particles with a dust which becomes a part of the pavement when laid, and abruptly stopping said particles and then adding more dust to the surface thereof, and cooling the particles whereby said particles will remain separate when piled.

4. The process of forming paving material which consists in utilizing hot paving material, disintegrating it by an air blast into fine particles which are set in motion by the air blast, and then injecting a second air blast into said material after it has been separated into particles by the first air blast, and coating these fine particles with a dust which becomes a part of the pavement when laid, and cooling the particles whereby said particles will remain separate when piled.

5. The process of forming paving material which consists in utilizing hot paving material, then dropping it by gravity, and while the paving material is dropping by gravity injecting an air blast against it, the air blast moving at an angle to the gravity movement of the paving material, and disintegrating the paving material into fine particles which are set in motion in a direction at an angle to the gravity motion thereof, and simultaneously coating said particles with a dust which becomes a part of the pavement when laid.

6. An apparatus for forming paving material comprising a receptacle for holding the hot material to be acted upon, means for discharging it from said receptacle, an air chamber into which said hot material is inserted, and means for discharging air at a high velocity into said air chamber to divide said material into fine particles, and a second means for discharging air at a high velocity into said material after it has been divided into fine particles.

7. An apparatus for forming paving material comprising a receptacle for holding the hot material to be acted upon, means for discharging it from said receptacle, an air chamber into which said hot material is inserted, and means for discharging air at a high velocity into said air chamber to divide said material into fine particles, and a second means for discharging air at a high velocity into said material after it has been divided into fine particles, the air chamber being contracted at the point where the air is discharged from said second means into said material.

8. An apparatus for forming paving material comprising a receptacle for holding the hot material to be acted upon, means for discharging it from said receptacle, an air chamber into which said hot material is inserted, and means for discharging air at a high velocity into said air chamber to divide said material into fine particles, and a second means for discharging air at a high velocity into said material after it has been divided into fine particles, the air chamber being contracted at the point where the air is discharged from said second means into said material, said air chamber being enlarged at a point beyond where the air is injected into the material by said second means.

9. An apparatus for forming paving material comprising a receptacle for holding the hot material to be acted upon, means for discharging it from said receptacle, an air chamber into which said hot material is inserted, and means for discharging air at a high velocity into said air chamber to divide said material into fine particles, and means for coating said particles with a dust while they are in motion which becomes a part of the pavement when laid.

10. An apparatus for forming paving material comprising a receptacle for holding the hot material to be acted upon, means for discharging it from said receptacle, an air chamber into which said hot material is inserted, and means for discharging air at a high velocity into said air chamber to divide said material into fine particles, and means for coating said particles with a dust while they are in motion which becomes a part of the pavement when laid, a revolving cylinder into which said particles are injected by said air, and a baffle in said cylinder against which said particles strike.

11. An apparatus for forming paving material comprising a receptacle for holding the hot material to be acted upon, means for discharging it from said receptacle, an air chamber into which said hot material is inserted, and means for discharging air at a high velocity into said air chamber to divide said material into fine particles, and means for coating said particles with a dust while they are in motion which becomes a part of the pavement when laid, a revolving cylinder into which said particles are injected by said air, and a baffle in said cylinder against which said particles strike, and means for adding to the dust coating of said particles while they are in said rotating cylinder.

12. An apparatus for forming paving material comprising a receptacle for holding the material to be acted upon, a conveyor below said receptacle which controls the discharge of the material therefrom, an air chamber into which the material is discharged from said conveyor, a plurality of air jets spaced around said air chamber for forcing air under pressure into contact with said material so as to disintegrate it into particles, and means for inserting atmospheric air into said air chamber while the air under pressure is being forced therein.

13. An apparatus for forming paving material comprising a receptacle for holding the material to be acted upon, a conveyor below said receptacle which controls the discharge of material therefrom, an air chamber into which the material is discharged from said conveyor, a plurality of air jets spaced around said air chamber for forcing air under pressure into contact with said material so as to disintegrate it into particles, an air jet discharging into the material in said air chamber after it has been acted upon by the first mentioned air jets.

14. An apparatus for forming paving material comprising a receptacle for holding the material to be acted upon, a conveyor below said receptacle which controls the discharge of material therefrom, an air chamber into which the material is discharged from said conveyor, a plurality of air jets spaced around said air chamber for forcing air under pressure into contact with said material so as to disintegrate it into particles, an air jet discharging into the material in said air chamber after it has been acted upon by the first mentioned air jets, a receptacle for containing dust which becomes a part of the pavement when laid, said receptacle discharging into the material after it has been acted upon by said air.

15. An apparatus for forming paving material comprising a receptacle for holding the material to be acted upon, a conveyor below said receptacle which controls the discharge of material therefrom, an air chamber into which the material is discharged from said conveyor, a plurality of air jets spaced around said air chamber for forcing air under pressure into contact with said material so as to disintegrate it into particles, an air jet discharging into the material in said air chamber after it has been acted upon by the first mentioned air jets, a receptacle for containing dust which becomes a part of the pavement when laid, said receptacle discharging into the material after it has been acted upon by said air, and means for discharging said dust in measured quantities.

16. An apparatus for forming paving material, comprising a receptacle for holding the material to be acted upon, an air chamber, means for discharging material from the receptacle into the air chamber, a plurality of air nozzles distributed about the air chamber and discharging into it, the air chamber having a contracted end at a distance from said nozzles, an air nozzle discharging air at this contracted end, and means for adjusting the position of said latter air nozzle.

JACOB B. CHAPLINE.